United States Patent [19]

Juriga

[11] Patent Number: 5,549,776
[45] Date of Patent: Aug. 27, 1996

[54] SELF-SUPPORTING IMPACT RESISTANT LAMINATE

[75] Inventor: Duane M. Juriga, Davidson, N.C.

[73] Assignee: Indian Head Industries, Charlotte, N.C.

[21] Appl. No.: 332,871

[22] Filed: Nov. 1, 1994

Related U.S. Application Data

[60] Continuation-in-part of Ser. No. 86,157, Jul. 2, 1993, which is a division of Ser. No. 658,336, Feb. 20, 1991, Pat. No. 5,258,585.

[51] Int. Cl.⁶ .......................... B29C 51/02; B29C 51/14; B32B 31/20
[52] U.S. Cl. .......................... 156/228; 156/222; 156/245; 156/308.2; 264/258
[58] Field of Search .......................... 156/77–79, 222, 156/228, 245, 308.2, 309.6; 428/220, 314.2, 317.5, 317.7, 319.9; 181/284, 288, 290, 291, 294, 296; 264/258

[56] References Cited

U.S. PATENT DOCUMENTS

| | | |
|---|---|---|
| 4,129,672 | 12/1978 | Momura et al. . |
| 4,241,806 | 12/1980 | Metzger . |
| 4,247,586 | 1/1981 | Rochlin . |
| 4,257,998 | 3/1981 | Diepenbrock, Jr. et al. . |
| 4,263,356 | 4/1981 | Nomura et al. . |
| 4,313,524 | 2/1982 | Rose . |
| 4,418,108 | 11/1983 | Lin . |
| 4,476,183 | 10/1984 | Holtrop et al. .................. 428/317.1 |
| 4,507,351 | 3/1985 | Johnson ............................ 428/198 |
| 4,695,501 | 9/1987 | Robinson ......................... 428/317.1 |
| 4,944,992 | 7/1990 | Yoneshige et al. . |
| 4,981,750 | 1/1991 | Murphy ............................ 428/220 |
| 5,007,976 | 4/1991 | Satterfield et al. ................ 156/222 |
| 5,108,474 | 4/1992 | Riedy ................................. 55/485 |
| 5,204,170 | 4/1993 | Kuyzin ............................... 428/244 |
| 5,211,792 | 5/1993 | Carter ............................... 156/306.6 |
| 5,258,585 | 11/1993 | Juriga ............................... 181/286 |
| 5,436,064 | 7/1995 | Schnegg ............................ 428/234 |

OTHER PUBLICATIONS

Webster's II New Riverside Dictionary, Houghton–Miffin Co., Boston, MA (1984) p. 1049.

Primary Examiner—Daniel J. Stemmer
Attorney, Agent, or Firm—Howard & Howard

[57] ABSTRACT

A method of forming a lightweight, contoured, structurally stable, self-supporting laminate comprises laying down, in succession, a finish lamina, a first heat activated adhesive, a first thermoformable scrim lamina, a second heat activated adhesive, a high density polymeric foam lamina, a third heat activated adhesive, and a second thermoformable scrim lamina thereby forming an unbonded laminate. This unbonded laminate is then uniformly heated in an oven to a temperature sufficient to make the adhesives bondable thereby forming a heated, substantially unbonded laminate. This heated, substantially unbonded laminate is then quickly transferred to a contoured die press and permanently bonded and formed, under pressure. The laminate is permanently bonded utilizing the residual heat in the laminate to form a contoured, structurally stable, self-supporting, impact resistant laminate.

7 Claims, 1 Drawing Sheet

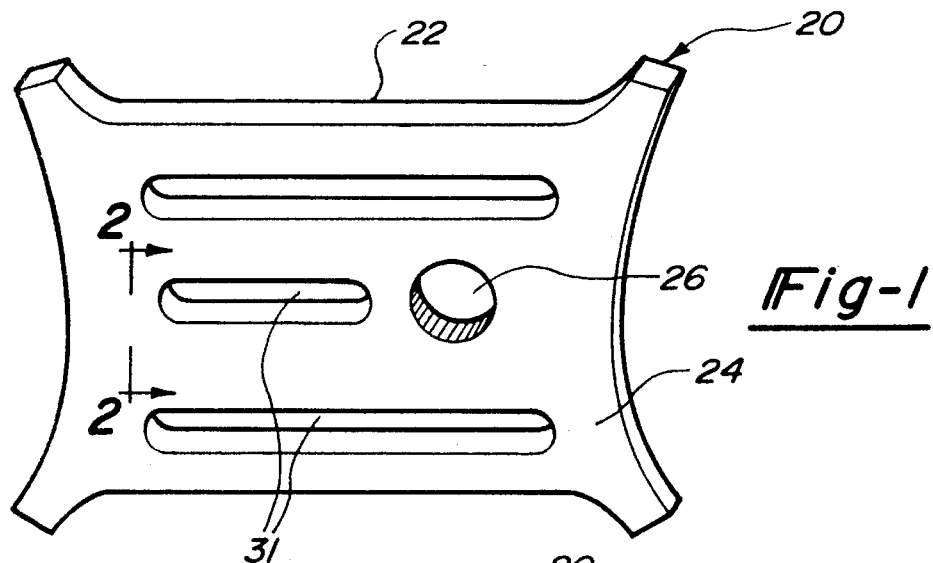
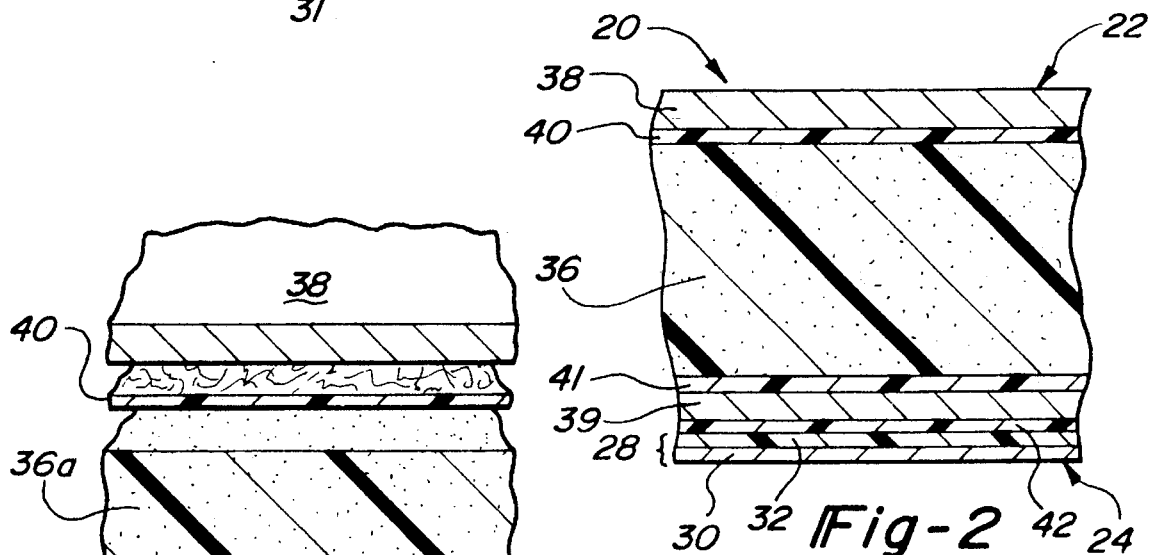
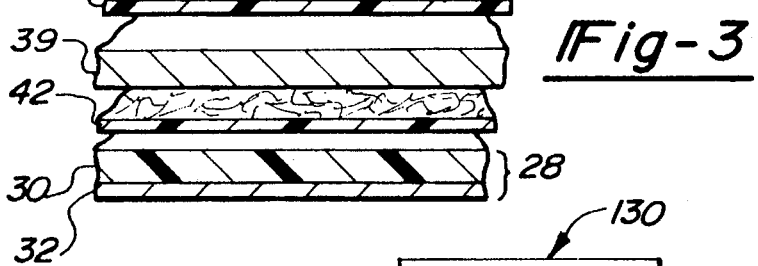
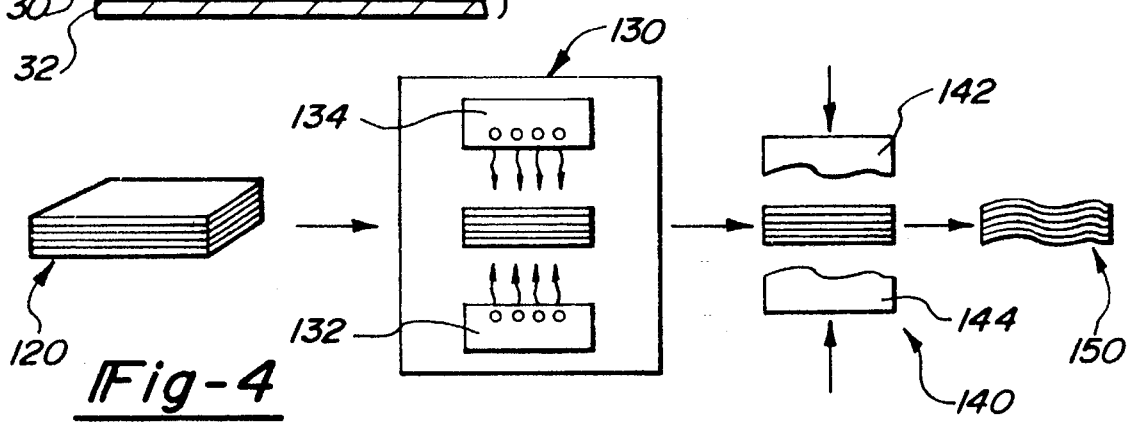

SELF-SUPPORTING IMPACT RESISTANT LAMINATE

This application is a continuation-in-part application of co-pending application Ser. No. 08/086,157, filed Jul. 2, 1993, which is a divisional application of application Ser. No. 07/658,336, filed Feb. 20, 1991, now U.S. Pat. No. 5,258,585, issued Nov. 2, 1993.

FIELD OF THE INVENTION

This invention relates to laminates, particularly thermoformable laminates which are structurally stable and self-supporting and methods of forming same. Further, the laminates of this invention are lightweight, impact resistant and relatively inexpensive to manufacture. The laminates provide a thermal and/or sound barrier, such as may be utilized as a vehicle headliner or other interior body panel, or in structural applications, including office partitions and ceiling panels. The laminates include a finish lamina and a substrate lamina comprising a flexible foam lamina and multiple supporting scrim laminae. In a preferred embodiment, thin flexible adhesive webs located between the laminae bond the laminae together forming a structurally stable, self-supporting laminate.

BACKGROUND OF THE INVENTION

Various materials have been proposed and utilized as insulating barriers, including thermoformable composites and laminates. In certain applications, such as vehicle headliners, the insulating barrier must be able to withstand temperatures exceeding 200° F. for several hours without sagging, absorb sound and provide an attractive wear and scuff resistant finish surface. As will be understood, these requirements are difficult to achieve and have not been achieved by the prior art.

A typical thermoformable laminate used for automotive headliners is disclosed in U.S. Pat. No. 4,695,501. As shown in FIGS. 3 and 4 of such patent, the laminate includes polymeric foam laminae which are adhesively bonded and enclosed by "fabric" laminae, which are fiber mats impregnated with a thermoformable polymeric resin. In the commercial embodiment, the fiber of the mats has a fineness of about six denier and the foam is a closed cell styrene-maleic anhydride structural foam. The resultant laminate is subject to sagging at elevated temperatures because the nonwoven mat is bonded directly to the automotive roof. Thus, the automotive companies have required substantial improvements in structural integrity and sound attenuation, while also demanding that production costs be minimized.

Automotive headliners and interior body panels have evolved from a fabric layer on fiberboard to composite thermoformable laminates specifically designed or adapted to the requirements of the automotive original equipment manufacturer and the particular vehicle design. The technology of structural barriers, such as office partitions, has also evolved from a fabric covered foam to improved designs specifically adapted to provide an attractive self-supporting structures including composite laminates. The need, however, remains for improved thermal and sound barriers which are dimensionally stable, impact resistant and light-weight. The use of a porous foam or fiber mat substrate as disclosed in several prior art patents can be relatively expensive to manufacture. Thus, the need also remains for improved automotive body panels and headliners which are structurally stable, particularly at elevated temperatures, yet lightweight and inexpensive to manufacture.

SUMMARY OF THE INVENTION

The preferred embodiments of the laminate of this invention will now be described in relation to an improved vehicle headliner. It will be understood, however, that the improvements in the laminate, including the improvements in structural integrity are adaptable for other applications, including other automobile interior body panels, office partitions and ceiling panels. The improvements may also be utilized in other applications, such as wall coverings. For ease of description, however, the present invention will be described in relation to a vehicle headliner embodiment, which is not intended to limit the application of the disclosed inventions.

The laminate of this invention preferably includes a finish lamina and a substrate lamina which supports the finish lamina. The substrate laminate comprises a foam layer sandwiched between two scrim layers. The substrate laminae are adhesively bonded in a face-to-face relation to each other. Preferably, a thin flexible adhesive sheet is located between the scrim and foam laminae thereby permanently bonding the laminae together. The adhesive sheet is lightweight and flexible and relatively inexpensive, yet forms a strong, durable bond between the laminae. A similar adhesive sheet may also be utilized to bond the finish lamina to the substrate laminae.

The laminate of the invention herein takes advantage of its "I-beam" construction of the substrate lamina to form a structurally stable, self-supporting, and impact resistant laminate which is lightweight and inexpensive to manufacture. The foam lamina is lightweight, flexible and deformable. The scrim laminae are strong and durable and provide structural stability. When bonded together, the scrim-foam-scrim laminate provides a structure which is elastically pliable, i.e, impact resistant, yet strong and durable. The structure is also lightweight and relatively inexpensive to manufacture. The finish lamina provides a soft hand feel without adding an excessive amount of weight to the structure.

The disclosed embodiments of the laminates of this invention also have improved structural stability and are self-supporting. In automotive applications, where the insulating laminate may be utilized as an automotive headliner, for example, the improved laminates are structurally stable at elevated temperatures, are self-supporting, and impact resistant. The preferred embodiment of the improved laminate includes a clothlike or other finish lamina, a polymeric foam lamina and fiber reinforcing scrim laminae bonded to the foam lamina by lightweight adhesive web.

The foam lamina may be any conventional foam, such as a styrene-maleic anhydride copolymer, but in the preferred embodiment the foam cells are preferably not fully closed, as described in the above-referenced U.S. patent. The preferred embodiment of the contoured laminate of this invention also includes an improved fiber reinforcing scrim which structurally reinforces the laminate and reduces sag, particularly at elevated temperatures. In the preferred embodiment, the scrim is a spunbonded polymeric sheet, most preferably of substantially continuous filament polyester fibers randomly arranged, highly dispersed and bonded at the filament junctions. In the most preferred embodiment of a contoured laminates the filaments are crimped and the filaments have a fineness of about 2–10 denier, such that the scrim may be contoured in relatively deep draws without reducing the structural integrity of the scrim.

The preferred thin flexible adhesive sheet is a web comprises a mesh-like or gauze-like material containing a large strand polyester blend with adhesive mixed therein. The adhesive web is lightweight and extremely thin, yet provide a strong bond between the laminae. This adhesive web has advantages relative to other adhesive sheets known in the art because it provides structural stability to the laminate of the invention herein without adding excessive weight to the laminate.

The method of forming the improved structurally stable, self-supporting laminate of this invention preferably includes forming the preferred laminae, including the finish lamina and the fiber reinforcing scrim laminae. A foamable material, such as a high density partially closed cell styrene-maleic anhydride copolymer, is preferably formed in situ. The laminae are laid in place in face-to-face relation with an adhesive, preferably the preferred adhesive web, placed between the laminae. The unbonded laminate is preheated in an oven containing radiant energy sources to at least the glass transition temperature of the adhesive web. In the oven, the foam expands to approximately twice its original thickness. The laminate is then quickly shuttled into a die, such as a contoured epoxy die used to form the configuration of a vehicle headliner, and formed into the desired configuration. Heat sensitive adhesives in the adhesive material bond the laminae. In the most preferred embodiment, the thermoformable adhesive web, located between the finish lamina and the substrate lamina, and between the laminae forming the substrate lamina will bond the structure as described above to form a structurally stable, light-weight, self-supporting laminate.

Other advantages and meritorious features of the laminate of this invention will be more fully understood from the following description of the preferred embodiments, the appended claims and the drawings, a brief description of which follows.

BRIEF DESCRIPTION OF THE DRAWINGS

FIG. 1 is a plan view of a conventional automotive headliner which may be formed from the laminate of this invention;

FIG. 2 is a cross-sectional view of the laminated construction of the headliner of FIG. 1, in the direction of view arrows 2—2;

FIG. 3 is an exploded view of the laminate shown in FIG. 2, prior to lamination;

FIG. 4 is schematic of a method of making the laminate of the invention herein.

DETAILED DESCRIPTION OF THE PREFERRED EMBODIMENTS OF THE INVENTION

FIG. 1 is a simplified view of a contoured automotive headliner 20 having a top surface 22, which is secured to the roof of the vehicle, and a bottom finish surface 24, which faces the occupants of the vehicle. The headliner may include openings, such as the central opening 26 which accommodates a central dome light, and draws (not shown) to accommodate the configuration of the vehicle roof or ribs 31 for strength and styling purposes. As stated above, the automotive headliner 20 must be able to withstand temperatures up to about 200° F. or greater for extended periods of time without sagging. The finish surface 24 should be attractive in appearance and be able to withstand the wear and tear of use over a period of years. The finish surface 24 also preferably has a soft hand feel to it provided by the soft finish lamina in conjunction with the impact resistant substrate lamina of the contoured laminate structure. The automotive headliner also absorbs some of the sounds generated in the vehicle compartment. If no headliner were included in the vehicle, any sound generated in the vehicle would reverberate off of the metal roof creating an unpleasant atmosphere. The automotive headliner also serves as a dampener for the sheet metal roof by absorbing sound energy translated through the roof.

The embodiment of the composite laminate of the headliner 20 shown in FIGS. 2 and 3 is also particularly adapted to be structurally stable at elevated temperatures. As set forth above, the prior art headliners tend to sag at elevated temperatures over time. The disclosed embodiment of the headliner 20 includes a plurality of thermoformable laminae which, in combination, reduce sag. The laminate is structurally stable, self-supporting, light-weight and impact resistant. The composite laminate disclosed in FIGS. 2 and 3 includes a finish lamina 28, a foam lamina 36 and scrim layers 38 and 39. The finish laminae 28 in the disclosed embodiment includes a face fabric 30, which is bonded to a relatively thin layer of an open cell foam layer 32. As set forth above, the finish surface 24 must be able to withstand the normal wear encountered in a vehicle. In the disclosed embodiment, the face fabric is a nylon knit, providing excellent wear resistance. The face fabric may also comprise cloth or vinyl or other known fabric or material used in similar applications. The open cell foam layer 32 may be polyester, polyether or polyurethane foam providing a soft hand feel for the laminate. The foam layer 32 may be eliminated by utilizing, for example, a needle punched olefin fiber. Thus, the thermoformable finish lamina 28 provides an attractive appearance and feel for the passenger compartment, but is able to withstand the normal wear encountered in a vehicle. This feature may also be important in other applications.

The thermoformable foam lamina 36 is preferably a structural component of the substrate laminate and should be dimensionally stable. The foam lamina also conforms to the desired shape during forming, as described below. A suitable foam is a styrene-maleic anhydride copolymer (e.g. Dylark™) available from Arco Chemical Company. Other foam compositions may be utilized. For example, foam material sold under the trade name Noryl™ from G. E. Plastics can be utilized. However, the most preferred foam herein is the Dylark™ foam material due to its improved compatibility and dimensional stability. The preferred foam composition has a density of about four to five pounds per cubic foot following expansion which, as set forth below, is about 100 to 120% in the disclosed embodiment.

The thermoformable scrim laminae 38 and 39 support the contoured laminate and provide further structural integrity. In the preferred embodiment, the scrim comprises spun-bonded, randomly arranged, thermoset polyester filaments. In the most preferred embodiment, the scrim are formed of continuous filament polyester fibers that are randomly arranged, highly dispersed and bonded at the filament junctions. A suitable polyester scrim has a fineness of about 4 denier per filament or a range of 2–10 denier. In the most preferred embodiment, the fibers are crimped to better bridge deep drawn areas as the laminate is formed into a contoured shape, as described below. Suitable scrim laminae are spunbond bi-component fabric like NHD50 or NHD80 Colback™ available from BASF Corporation. Alternative scrim laminae include Manniwels™ 5080, 5081 and 5082 available from Lydall, Inc. The scrim lamina, however, preferably does not include filler materials, such as fiberglass filaments because of environmental concerns. A suitable scrim of this type is available, for example, from Reemay, Inc. of Old Hickory, Tenn. under the trade name Reemay Spunbonded Polyester.

As described above, the utilization of a scrim 38 at the top surface 22 of tile headliner, particularly a spunbonded continuous filament polyester scrim, provides an important advantage for the composite laminate of this invention. The scrim may be bonded to the vehicle roof, providing dimensional stability to the headliner. The headliner may also be removed without substantial damage to the vehicle in a roof bonded headliner application. The headliner may also be secured with mechanical fasteners.

The adhesively bonded, sandwich configuration of the scrim-foam-scrim supporting substrate laminate provides an important advantage for the contoured laminate of this invention. The substrate laminate provides an "I-beam" construction resulting in a structurally stable, self-supporting, impact resistant design and support structure for the contoured laminate of the invention herein. The scrim laminae are strong and durable while the foam laminae is soft and flexible. Bonded together, the laminate forms a structurally stable, self-supporting and impact resistant structure. Since all the components of the contoured laminate are in and of themselves lightweight, the laminate itself is lightweight, yet durable and structurally stable.

The thermoformable scrim laminae 38 and 39 are adhesively bonded to the thermoformable foam lamina 36. The bonding surfaces of the laminae of the contoured laminate may be coated with a heat actuated adhesive. Adhesive layers may also be applied between the surfaces to be bonded prior to thermoforming the contoured laminate. The laminae 28, 36, 38 and 39 are bonded by suitable adhesives, including polyamide and polyethylene adhesives having a low initiation temperature, e.g., 250°–270° F. Adhesive layers bond the laminae in face-to-face relation. In a preferred embodiment, the adhesive is heat actuated, such that the laminate can be simultaneously formed and bonded in a conventional die press.

In a most preferred embodiment, the contoured laminate comprises adhesive webs 40 and 41. The substrate laminate, comprising the scrim laminae 38 and 39, foam lamina 36 and adhesive laminae 40 and 41, may also be bonded to the finish lamina 28 by another adhesive web 42. The adhesive layers 40, 41 and 42 bond the laminae in face-to-face relation. Preferably, the adhesive is in the form of a sheet. A most preferred adhesive comprises a very thin, web material containing a large strand polyester blend having an adhesive dispersed therebetween. The preferred adhesive web is a mesh-like or gauze-like material preferably prepared from plasticizer free cold polyester resins and have a basis weight of from about 0.5 to 0.8 ounce per square yard. The adhesive web material is thermoformable and has a glass transition temperature of about 270°–285° F.

The thickness of the adhesive material will depend upon the particular application. A thickness of less than 5 millimeters is generally preferred, although a web of 10 millimeters may be used in some applications while retaining the advantages of this invention. The most preferred range of thicknesses for the web is 1–3 millimeters and a polyethylene web having a thickness of 1.5 millimeters has been found to be excellent for automotive interior panels, including headliners. Polyethylene strands are the most preferred material for the web because a polyethylene web is flexible and thermoformable. Other materials may, however, prove satisfactory for inclusion in the web, e.g., polyurethane mesh. The preferred adhesive will depend upon the particular application and is not limited to the disclosed adhesives. Suitable adhesive materials are available from Dry Adhesive Technologies under the Spunfab™ tradename, including Spunfab™ 2047, 2900, and 2056. Upon heating and molding the laminate, the adhesive web bonds the individual laminae to one another forming a structurally stable, self-supporting, impact resistant laminate. In the most preferred embodiment, the adhesive is heat actuated, such that the laminate can be simultaneously formed and bonded in a conventional die press.

FIG. 3 illustrates the laminate 20 prior to lamination. FIG. 4 is a schematic of an inventive process shown being used for making the novel laminate. The scrim laminae 38 and 39, the foamable lamina 36a, and finish lamina 28, and the adhesive webs 40, 41 and 42 positioned between the laminae are laid in place, preferably on a flat supporting surface. The individual laminae are in face-to-face relation but remain in an unbonded form until they are heated and molded. The unbonded laminate 120 is placed into a hot air recirculated thermoforming oven 130 containing radiant heat sources 132 and 134. Most preferably, the laminate is heated in an oven containing radiant heaters, e.g., ceramic heaters, that will uniformly heat the laminate to at least the glass transition temperature of the adhesive (e.g., 270°–285° F.). In a conventional application, the oven is heated to a temperature of 280°–315° F. and the unbonded laminate is heated therein for about two to three minutes to form a heated, substantially unbonded laminate. The contoured configuration of the laminate is then formed with the residual heat of the laminate by placing the heated laminate in a mold and applying pressure to die parts 142 and 144 bringing them together, under pressure, forming the preferred configuration of the resultant laminate 150. Preferably, the mold is an epoxy or aluminum mold. In the disclosed embodiment, the foam lamina 36a expands to approximately twice its original thickness during its exposure to heat in the thermoforming oven 130 to the dimension of lamina 36, as shown in FIG. 2. Preferably, the die used to mold the contoured part has cooling coils therein, i.e., chilled die, to promote heat transfer from the laminate to the mold parts. The heat from the hot laminate activates the adhesives in the laminate, bonding the laminae. Since each lamina of the laminate is thermoformable, the laminate is easily molded to the desired shape in the die press forming the preferred contoured composite laminate 150.

Although the inventive method is disclosed in combination with the inventive laminate disclosed in FIGS. 2 and 3, it should be understood that other laminates will benefit from this method. This is particularly true for laminates such as those disclosed in the parent of this application, U.S. Pat. No. 5,258,585. The disclosure of the composition of the laminates and method of forming the laminates in that patent are specifically incorporated herein by reference.

The composite laminate 20 has important advantages over the prior art, including improved dimensional stability and reduced sag as described above. These improvements may also be utilized in other applications, including office partitions, ceiling panels and even wall coverings for residences.

As will be understood by those skilled in the art, various modifications may be made to the disclosed embodiments of the insulating laminate of this invention within the purview of the appended claims. For example, various filler materials may be added to the substrate laminate including a fiber mat comprising fibers and materials adapted to absorb sound at predetermined frequencies. The utilization of a composite finish lamina may be preferred in certain applications. However, any finish lamina, including woven and nonwoven cloth or fibrous materials may be preferred in other applications. Preformed foam sheets may be preferred in barriers that are not contoured, permitting the use of a wider range of foam laminae. Finally, the continuous filament spunbonded scrim is preferred in applications where the laminate is bonded to another surface, particularly where the laminate is suspended from the supporting surface, such as an automotive roof. A soft finish lamina is preferred in applications that require or favor a soft hand feel on the exposed surface. It will be understood, however, that many applications do not require this, as found in a commercial transport vehicle compartment, and therefore a soft finish lamina may not be required in such applications.

Having described my invention in alternative embodiments, I now claim my invention, as follows:

1. A method of forming a lightweight, contoured, structurally stable, self-supporting laminate, said method comprising:

(a) laying down, in succession, a finish lamina, a first heat activated adhesive, a first thermoformable scrim lamina, a second heat activated adhesive, a high-density at least partially closed cell polymeric foam lamina, a third heat activated adhesive, and a second thermoformable scrim lamina thereby forming an unbonded laminate;

(b) uniformly heating said unbonded laminate in an oven to a temperature sufficient to make said adhesives bondable thereby forming a heated, substantially unbonded laminate; and (c) quickly transferring said laminate to a contoured die press and permanently bonding and forming, under pressure, said laminate in said contoured die press and applying pressure to outside surfaces of said laminate to permanently bond said laminate utilizing the residual heat in said laminate to form a contoured, structurally stable, self-supporting, impact resistant laminate.

2. The method of claim 1 wherein step (c) comprises quickly transferring said laminate in a contoured, chilled, epoxy mold from said oven and closing said die press thereby applying pressure to and molding said laminate to form a contoured, structurally stable, self-supporting, impact resistant laminate.

3. The method of claim 1 wherein the adhesives comprise adhesive webs comprising polyester, said webs having a glass transition temperature of about 270 to 285 degrees Fahrenheit and a basis weight of about 0.5 to 0.8 ounce per square yard, and wherein step (b) comprises uniformly heating said unbonded laminate in a hot air recirculating oven preheated to about 280–300 degrees Fahrenheit and then heating said unbonded laminate therein for about 2–3 minutes.

4. The method of forming a lightweight, contoured, structurally stable, self-supporting laminate defined in claim 1, wherein each of said scrim lamina comprise a thin spunbonded polymeric sheet of substantially continuous polyester fibers bonded at the filament junctions.

5. A method of forming a lightweight contoured vehicle interior panel, said method comprising:

(a) laying down, in succession, a cloth-like finish lamina, a first thin heat activated adhesive sheet, a first thermoformable scrim lamina, a second thin heat activated adhesive sheet, a high-density at least partially closed cell polymeric foam lamina, a third thin heat activated adhesive sheet, and a second thermoformable scrim lamina thereby forming an unbonded laminate; wherein said scrim laminae comprise randomly arranged nonwoven thermoset polymeric filaments having fineness of about two to ten denier, said filaments bonded at the filament junctions;

(b) uniformly heating said unbonded laminate in an oven to make said adhesive sheets bondable thereby forming a heated, substantially unbonded laminate; and (c) quickly transferring said laminate from said oven into a cold contoured die press and permanently bonding and forming, under pressure, said laminate in said contoured die press and closing said press thereby applying pressure to and molding said laminate with the residual heat in said laminate to form a contoured, structurally stable, self-supporting, impact resistant contoured laminate.

6. The method of claim 5, wherein the adhesives comprise adhesive webs comprising polyester, said webs having a glass transition temperature of about 270 to 285 degrees Fahrenheit and a basis weight of about 0.5 to 0.8 ounce per square yard, and wherein step (b) comprises uniformly heating said oven to about 280–300 degrees Fahrenheit and then heating said unbonded laminate therein for about 2–3 minutes.

7. The method of forming lightweight contoured vehicle interior panel as defined in claim 5, wherein each of said scrim lamina comprise a thin spunbonded polymeric sheet of substantially continuous polyester fibers bonded at the filament junctions.

* * * * *